(12) United States Patent
Nagarajan et al.

(10) Patent No.: US 8,604,390 B2
(45) Date of Patent: Dec. 10, 2013

(54) WELD WIRE ELECTRODE FOR GAS METAL ARC WELDING

(75) Inventors: Sundaram Nagarajan, Troy, OH (US); Fuhu Chen, Beavercreek, OH (US)

(73) Assignee: Hobart Brothers Company, Troy, OH (US)

( * ) Notice: Subject to any disclaimer, the term of this patent is extended or adjusted under 35 U.S.C. 154(b) by 2198 days.

(21) Appl. No.: 10/964,137

(22) Filed: Oct. 13, 2004

(65) Prior Publication Data

US 2006/0076336 A1    Apr. 13, 2006

(51) Int. Cl.
*B23K 35/02* (2006.01)

(52) U.S. Cl.
USPC ............... 219/145.1; 219/146.1; 219/146.24; 219/136

(58) Field of Classification Search
USPC ............ 219/145.1, 146.1, 146.24, 136
See application file for complete search history.

(56) References Cited

U.S. PATENT DOCUMENTS

| | | | |
|---|---|---|---|
| 2,063,470 A | | 12/1936 | Staples |
| 2,345,758 A | * | 4/1944 | Lincoln et al. ............ 219/137 R |
| 2,612,583 A | * | 9/1952 | Bernard ........................ 428/613 |
| 2,909,778 A | * | 10/1959 | Landis et al. .............. 219/146.3 |
| 3,118,053 A | * | 1/1964 | Masayasu et al. ........ 219/145.22 |
| 3,210,213 A | * | 10/1965 | Cotter et al. .................. 428/386 |
| 3,531,620 A | * | 9/1970 | Arikawa et al. .......... 219/146.52 |
| 3,800,405 A | | 4/1974 | Ziemek |
| 4,013,211 A | | 3/1977 | Atman |
| 4,048,705 A | * | 9/1977 | Blanpain et al. ................ 419/61 |
| 4,086,463 A | * | 4/1978 | Omori et al. ............. 219/145.22 |
| 4,134,528 A | | 1/1979 | Bähre et al. |
| 4,214,145 A | * | 7/1980 | Zvanut et al. ............ 219/145.22 |
| 4,697,791 A | * | 10/1987 | Henderson et al. ............. 266/48 |
| 4,787,142 A | * | 11/1988 | Henderson et al. ............. 29/825 |
| 5,003,155 A | | 3/1991 | Chai et al. |
| 5,055,655 A | | 10/1991 | Chai et al. |

* cited by examiner

*Primary Examiner* — Alexandra Elve

(74) *Attorney, Agent, or Firm* — Patentbar International, P.C.

(57) ABSTRACT

A weld wire electrode for use as a consumable in a gas-metal arc welding process comprises two or more strips wrapped around one another and drawn to a desired wire diameter.

4 Claims, 5 Drawing Sheets

Prior Art

WELD WIRE ELECTRODE FOR GAS METAL ARC WELDING

FIELD OF THE INVENTION

The invention relates generally to a welding process with a consumable weld wire electrode. More specifically, the invention relates to the gas-metal arc welding process in which nested coaxial or non-coaxial strips comprise a consumable electrode used in the process.

BACKGROUND OF THE INVENTION

Gas metal arc welding (GMAW) is a welding process in which an electrical arc between a filler metal and a work piece heats the filler metal and the work piece and welds them together. The filler metal in the GMAW process is usually a consumable electrode which is fed into the process as fast as it is consumed. The electric current passes through the electrode and the electrical arc is formed between the tip of the consumable electrode and the metal of the work piece. The GMAW welding process can be used to join two pieces of sheet metal together, as well as in many other applications. An example of a welding gun and an arrangement for GMAW is schematically shown in FIG. 1. A consumable welding electrode 14 is fed into the welding process through a welding gun 10. Electrode 14 is melted by an electrical arc 18 established between the electrode and the work piece consisting of metal sheets 11 and 13. Externally supplied gas, such as Ar, $CO_2$ or mixtures thereof, enters the welding process through a gas nozzle 12 in welding gun 10 and shields the arc, the tip of the electrode and the pool of molten metal 15 by forming a gas shield 16. The advantages of the GMAW process are the high quality weld that can be produced faster and with very little spatter and loss of alloying elements due to the gas shield and a stable electrical arc. The consumable electrode in FIG. 1, which is melted by the electrical arc, is transported by the arc to the work piece to serve as a filler metal. The arc produces the heat for the welding process and is maintained by the electron flow between a cathode (positive terminal) and an anode (negative terminal). In the GMAW context both the consumable electrode and the work piece can function as a cathode or an anode.

The electrical power for arc welding is obtained in two different ways. One of the ways is to generate it at the point of use, the other way is to convert it from available power from the utility line. The power conversion can involve a transformer converting a relatively high voltage from the utility line to a liner voltage for alternating current welding. Or it can involve a transformer to lower the voltage, following by a rectifier changing the alternating current to direct current for direct current welding. One of the advantages of the alternating current is cathode-related cleaning (sputtering) which removes refractory oxides from the joint surfaces, providing superior welds. In such a case, argon is the inert gas of choice for manual welding whether used with direct or alternating current.

The growing demand for increased electric arc welding productivity calls for continuing efforts to reduce welding time while improving productivity, especially in robotic welding applications. In order to operate a welder at its maximum capacity, a consumable electrode should be able to form good welding beads at a maximum possible travel speed without sacrificing the quality of the resulting weld. One of the ways to increase productivity is to increase the deposition rate and travel speed for a given weld size. On the other hand, it often happens that an increase in a travel speed leads to an increase of the number of welding defects.

One of the ways to increase deposition rates and travel speed without sacrificing other welding parameters is to change the geometrical structure and composition of consumable electrodes, which are often used in the form of wires. A wire electrode can be a solid electrode, as shown in FIG. 2A, or a cored electrode comprised of an external sheath and an internal core, as shown in FIG. 2B. One of the principles a developer uses in designing such electrodes for higher deposition rates is to increase electrical resistance of the wire electrode. The increased electrical resistance leads to increased heat generation and higher melting rate, leading to the faster speed of melting of the wire and to the desired higher deposition rates.

The known cored wire electrodes are usually classified as metal core wires and flux core wires. Cored wires are typically comprised by a metal or flux powder compacted into a solid granular-type core. Manufacturing of the cored wires usually involves forming, filling and then drawing or rolling the wire. A steel sheath is bent into a U-shape strip, then a predetermined amount of a metal powder, for example, iron powder, is fed into the U-shaped strip. The subsequent forming and drawing processes enclose the powder in the sheath and compact the wire to its final shape and size. Because of the compacted metal powder in the core of the wire, its electrical resistance to the flow of current is greater than that of a solid wire. Consequently, the deposition rates of metal cored wires are much higher than those of the solid wire electrodes. On the other hand, manufacturing of the metal core electrodes can be rather complex, since the powdered mixture is fed into a formed tube of a metal strip moving at high speed. Precise control of this process becomes very important to maintaining high quality wire manufacture, because sometimes a flux or powder dispenser has difficulties ensuring consistent filling of the tube.

One of the main characteristics of the metal core wires with compacted powdered metal in the core is the core fill percent. Variation of the core fill percent in turn causes variations of spatter during the GMAW process. Small variations of the ionizing potential caused by the changes in the core fill percent disturb the electric arc and cause undesired stutter during welding. Therefore, reducing the variations of the core fill percentage and the sputter has been an important consideration in designing the structure and composition of consumable cored electrodes.

SUMMARY OF THE INVENTION

The new weld wire electrode for gas-metal arc welding is a solid core weld wire with at least two concentric or non-concentric strips that are drawn to the desired wire diameter. In one of the embodiments, the wire comprises two or more concentric strips wrapped one around another. The strip-to-strip interfaces increase electrical resistance to the flow of current in the wire and force the current to propagate along the outermost strip, similar to the current propagation pattern in a metal core wire. The increased electrical resistance of the wire provides higher deposition rates than those of solid wires. The weld wire electrode made of two or more precision rolled metal stripes also reduces the level of sputter and ensures consistent diameters of the inner and outer strips with reduced variations in size and dimensions. A weld wire solid core electrode embodiment comprises a center strip made of a solid metal sheath bent in a lap or butt formation to form a core of the wire electrode, and a second solid strip sheath wrapped around the center strip and bent in a lap or butt formation. The double or triple strip weld wire electrode, which can be coaxial or non-coaxial, serves as a consumable electrode in a gas-metal arc welding process.

A non-coaxial weld wire electrode embodiment comprises an outer strip wrapped around an inner strip shaped into a solid inner core having a boundary with the outer strip.

In a general case a weld wire electrode comprises a solid core nested within a solid sheath, wherein the solid core can have a cross section of any desired cross section, including, but not limiting to, cylindrical or non-cylindrical ones. The solid core is made of non-powdered metal nested within a solid sheath. Such wire typically has interstices within the solid core and an interface between the core and the sheath. According to the experimental data, such wire achieves exemplary deposition rates of about 10.3 lbs/hr, about 15 lbs/hr. about 18.7 lbs/hr at the respective amperages of 250 A, 300 A, and 350 A.

A gas-metal arc welding process with the novel weld wire comprises feeding a consumable electrode into a gas-metal arc welding apparatus, wherein the electrode has a center strip made of a steel sheath bent in a lap or butt formation to form a core of the consumable electrode, and at least one more strip formed of a steel sheath wrapped around the center strip and bent in a lap or butt formation; forming a shielding atmosphere around the electrode; and igniting an arc between a work piece and the electrode to weld the work piece.

A gas-metal arc welding apparatus in which the wire is used comprises a gas-metal arc welding gun which has means for feeding a electrode into the welding gun; the electrode comprises a center strip made of steel sheath bent in a lap or butt formation forming a core of the electrode, and at least one more strip formed of a steel sheath wrapped around the center strip in a tight-fitting relationship and bent in a lap or butt formation; and a external or internal power source for supplying electrical current to the electrode.

From the manufacturing standpoint, feeding the inner strips into the outer one can be achieved very fast with consistent quality. Thus, the productivity can be greatly increased. Also, the mechanical and deposition properties of the novel weld wire are influenced by its microstructure and chemical composition, which can be very consistent along the length of the wire with minimal variations. This consistency in manufacture leads to better consistency in the weld metal chemistry and in strength and toughness properties along the length of the weld.

A weld wire with a solid core also has a significantly lower concentration of diffusible hydrogen than a cored wire. In a cored wire made of compacted powdered metal the surface area of the powdered core is usually large, leading to a tendency to attract and absorb moisture, which is less likely to be the case with the weld wire electrode of the present invention.

DETAILED DESCRIPTION OF THE INVENTION

Figure 1:
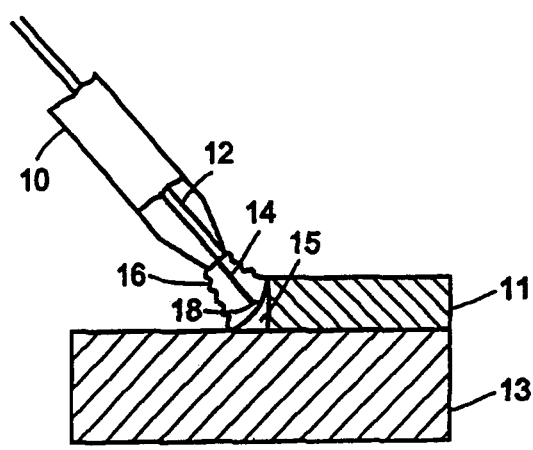
FIG. 1 is schematic illustration of a gas-metal arc welding process.
Figure 2A:
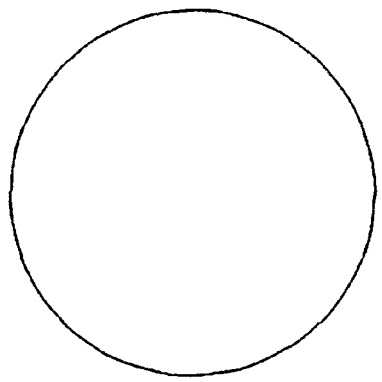
FIG. 2A is a cross section of a solid wire.
Figure 2B:
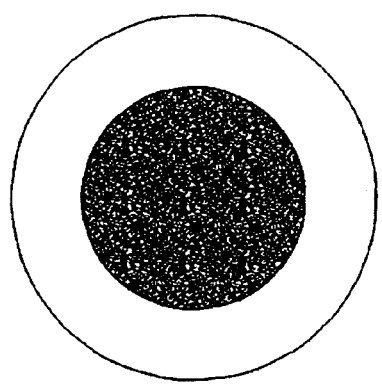
FIG. 2B is a cross section of a metal core wire.
Figure 3A:
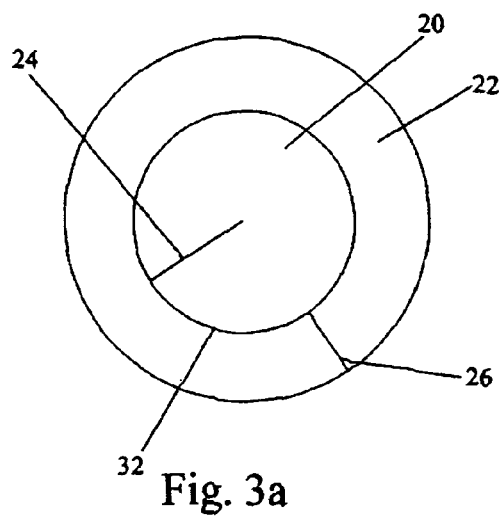
FIG. 3A is a cross section of a double strip coaxial weld wire.

As shown in FIG. 3A, a weld wire electrode is made of two concentric strips. The center, or the core strip 20, is made of a sheath bent to form a solid core of the wire. In this case the formed solid core of the wire differs from the traditionally know metal core wires which are composite tubular metal electrodes comprising a metal sheath and a core made of compacted powdered metallic filler compositions typically containing less that 5%, by total weight, of non-metallic inorganic compounds. In the present invention the core of the wire is not made of compacted powdered filler materials, but is made of a solid, non-powdered material. For example, the solid core of the present weld wire can be made of a continuous strip. The word "continuous" here means that strip is not made of compacted powdered filler compositions. The strip is preferably made of low carbon Mn alloyed steel, which is bent to form strip 20. Nevertheless, it is contemplated that another metal can be used as a strip material. The word "metal" herein means a metallic material, which includes metals and alloys of any desired composition. The preferable alloy used in the present weld wire is steel, including, but not limited to, mild steel, low alloy, stainless steel. The preferred metal could be aluminum.

As is seen in FIG. 3A, bent strip 20 has a seam 24, which can be in a lap or butt formation. In the preferred embodiment strip 20 is bent into a C-shape. Wrapped around center strip 20 is a second strip 22, which is formed by bending a strip into a sheath, similarly to the process of bending center strip 20. It is preferred that the second strip 22 is wrapped around center strip 20 sufficiently tightly in order to leave no gaps between the outer surface of strip 20 and the inner surface of strip 22. The wire formed by strips 20 and 22 is typically drawn to a desired size and has a cross section as shown in FIG. 3A. The cross section of the wire, illustrated in FIG. 3A, also shows an interface 32 between the solid core of strip 20 and the outer sheath of strip 22. Interface 32 is a boundary between the sheath and the core which is formed when the outer sheath wraps around the solid core. Strips 20 and 22 are bent and wrapped around one another, and then drawn to the desired diameter of the wire, which make the two strips fit very tightly against one another. Still, as is the case with many solid objects, there would remain interstices inside the weld wire, which are spaces or gaps that intervene between closely spaced solid core and sheath of the weld wire, as well as between the elements of the bent strips, even if they are tightly drawn. It is important to emphasize that strip 20 forms a solid core of the wire, in contrast with traditional metal core wires in which the core is formed by a compacted powder filler composition.

Figure 3B:
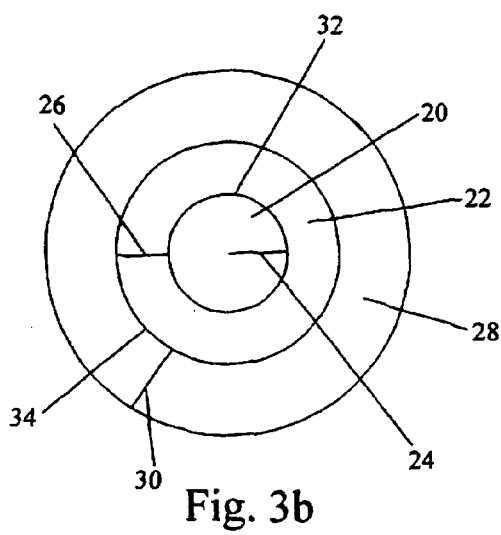
FIG. 3B is a cross section of a triple strip coaxial weld wire.

FIG. 3B shows another embodiment of the weld wire electrode in which a third strip 28 is wrapped around the second strip 22 in the same manner as strip 22 is wrapped around center strip 20. Seam 30 of strip 28 can also be formed in a lap or butt formation. The preferred material of strip 28 is low carbon Mn alloyed steel. It is preferable that strip 28 is wrapped around second strip 22 with no gaps between the outer surface of strip 22 and the inner surface of strip 28. Bent strips 20 and 22 form a solid core of the wire. The resulting cross section of the three-strip coaxial wire is presented in FIG. 3B. FIG. 3B also illustrates that a triple strip weld wire has two interfaces, 32 and 34. Interface 32 is formed between bent strip 20 and the sheath made of second strip 22. Interface 34 is formed between second strip 22 and third strip 28 bent around strip 22 in the same manner.

Figure 3C:
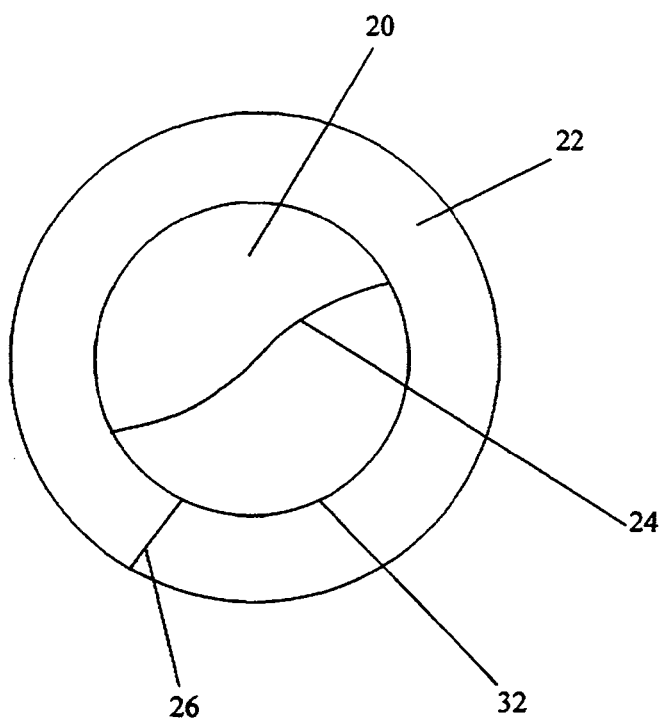
FIG. 3C is a cross section of a non-coaxial weld wire.
Figure 3D:
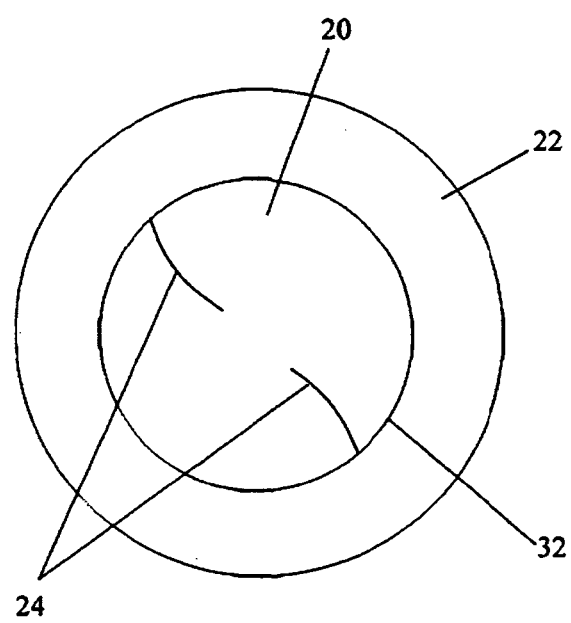
FIG. 3D is a cross section of a non-coaxial weld wire.

An alternative embodiment of the invention is shown in FIG. 3C. The inner solid core made of strip 20 with seam 24 is formed by bending a strip into a shape non-coaxial with the outer strip 22. It could be an S-shaped solid inner core, non-cylindrically shaped core or any other suitably shaped solid core. Such solid core wire electrode with a solid core and a boundary between the inner and outer portions of the wire are also within the reach and scope of the present invention. Yet another alternative embodiment is shown in FIG. 3D, where the solid core made of strip 20 is bent to form two seams 24. The cross section of the wire, illustrated in FIGS. 3C and 3D, also shows interface 32 between the solid core of strip 20 and the outer sheath of strip 22.

Shown in Table 1 are some of the weld wire configurations that were manufactured and tested in a number of test weld runs. Single, double and triple strip sheath wires were tested. The sheaths were made of Mn alloyed steel with the percentage of Mn varying up to 1.5%. The amount of Si in the steel sheaths varied from about 0.8% for 1.5% Mn to about 0.9% for about 1% of Mn. The wires exhibited a tensile strength of about 60 ksi for the 0.3% Mn alloyed steel, with an impact strength of 30 ft-lbs at OF; about 75 ksi tensile strength with an impact strength of 70 ft-lbs at −20 F; and about 70 ksi tensile strength with an impact of 40 ft-lbs at −20 F.

During the test welding runs, the resulting weld had the following approximate composition, which is presented in Table 2.

TABLE 2

Deposited chemistry of the resulting weld.

|  | C | Mn | Si | Ti | Al |
|---|---|---|---|---|---|
| SNSW-1-009 | .043 | 0.866 | 0.339 | 0.001 | 0.001 |
| SNSW-1-011 | 0.058 | 0.946 | 0.366 | 0.002 | 0.001 |
| SNSW-1-015 | 0.030 | 0.724 | 0.698 | 0.002 | 0.021 |

The test runs showed that the wires exhibited deposition rates and wire feed speeds as compared to the same parameters of the electrodes classified as ER70S-6 and E70C-6. Table 3 presents the ranges of deposition rates of the 0.045" diameter test wires at 250 A, 300 A, and 350 A currents.

TABLE 3

Deposition Rates (lbs/hr)

|  | 250A | 300A | 350A |
|---|---|---|---|
| ER70S-6 | 7.7 | 11.6 | 14.2 |
| E70C-6 | 8.6 | 11.9 | 14.8 |
| #1-004 | 8.8 | 12.3 | 14.9 |
| #1-005 | 9 | 12.3 | 15.5 |
| #1-016 | 10.4 | 15.4 | 19.2 |

Table 4 presents the wire feed speed comparison data for the same currents as in Table 3.

TABLE 1

|  | Diameter | Wire Configuration | Steel | Mechanical Properties |
|---|---|---|---|---|
| SNSW-1-001 | .062" | Single sheaths, R3370, lap formation | 0.3% Mn, no Si | 60 ksi tensile, 30 ft-lbs at 0 F. |
| SNSW-1-002 | .045" | Single sheath, R3370, G-lap formation. |  |  |
| SNSW-1-003 | .045" | Single sheaths, R3370, butt seam(hollow) |  |  |
| SNSW-1-004 | .045" | Double sheaths baked. R3170 steel |  |  |
| SNSW-1-005 | .045" | Triple sheaths baked, R3170 steel |  |  |
| SNSW-1-006 | .045" | Triple sheaths non-baked, R3170 steel |  |  |
| SNSW-1-007 | .062" | Triple sheaths non-baked, R3170 steel. |  |  |
| SNSW-1-008 | .062" | Triple sheaths baked, R3170 steel. |  |  |
| SNSW-1-009 | .045" | R3261/overlap 2 strips | 1.5% Mn, 0.8 Si | 75 ksi tensile, 70 ft-lbs at −20 F. |
| SNSW-1-010 | .045" | Triple strips R3261 steel |  |  |
| SNSW-1-011 | .062" | Triple strips R3261 steel |  |  |
| SNSW-1-012 | .062" | Double strips R3261 steel |  |  |
| SNSW-1-013 | .045" | Double strips overlap design. R3330 (.400 × .016) ultra low carbon inside. R3209 (.400 × .028) regular carbon outside. | 0.3% Mn, no Si | 30 ft-lbs at 0 F. |
| SNSW-1-014 | .045" | Double strips overlap design. R3330 (.400 × .016) ultra low carbon outside. R3209 (.400 × .028) regular carbon inside. |  |  |
| SNSW-1-015 | .045" | R3314, Double strip, butt seam formation. | 1.0% Mn, 0.9% Si | 70 ksi tensile and 40 ft-lbs at −20 F. |
| SNSW-1-016 | .045" | R3314, Double strip, lap seam formation. |  |  |

TABLE 4

| Wire Feed Speed Comparison (inch/min) | | | |
|---|---|---|---|
| | 250A | 300A | 350A |
| E70C-6 | 359 | 469 | 570 |
| #1-004 | 353 | 459 | 541 |
| #1-005 | 354 | 464 | 569 |
| #1-016 | 404 | 569 | 695 |

Figure 4:
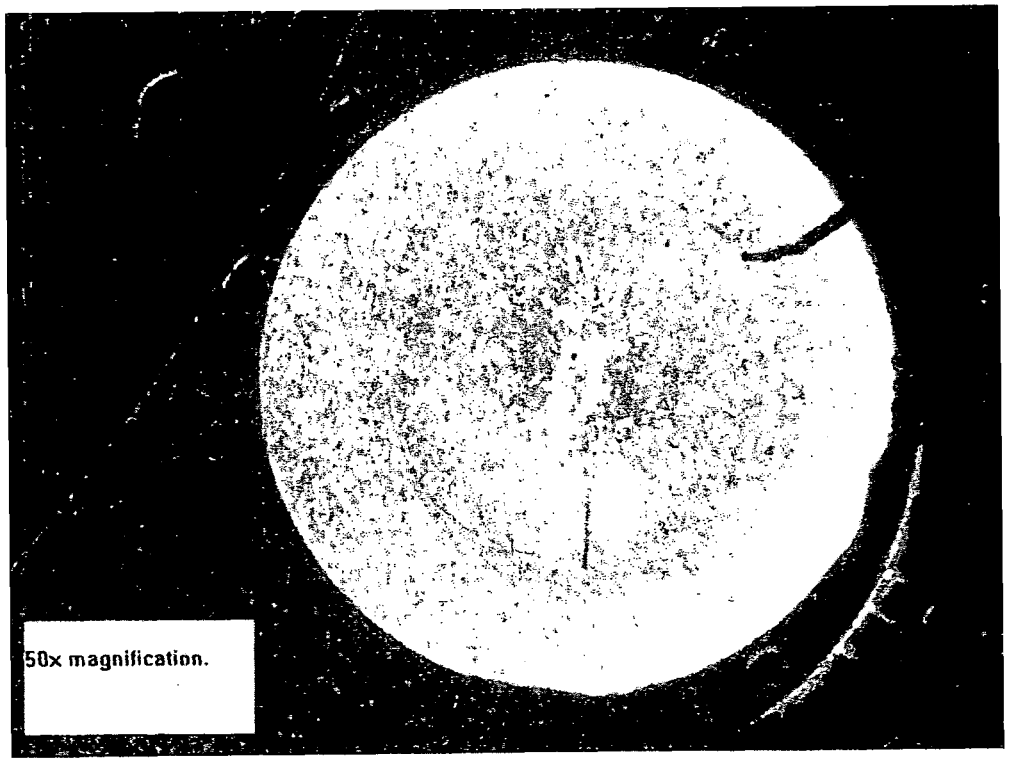
FIG. 4 is a magnified cross section of a coaxial weld wire.
Figure 5:
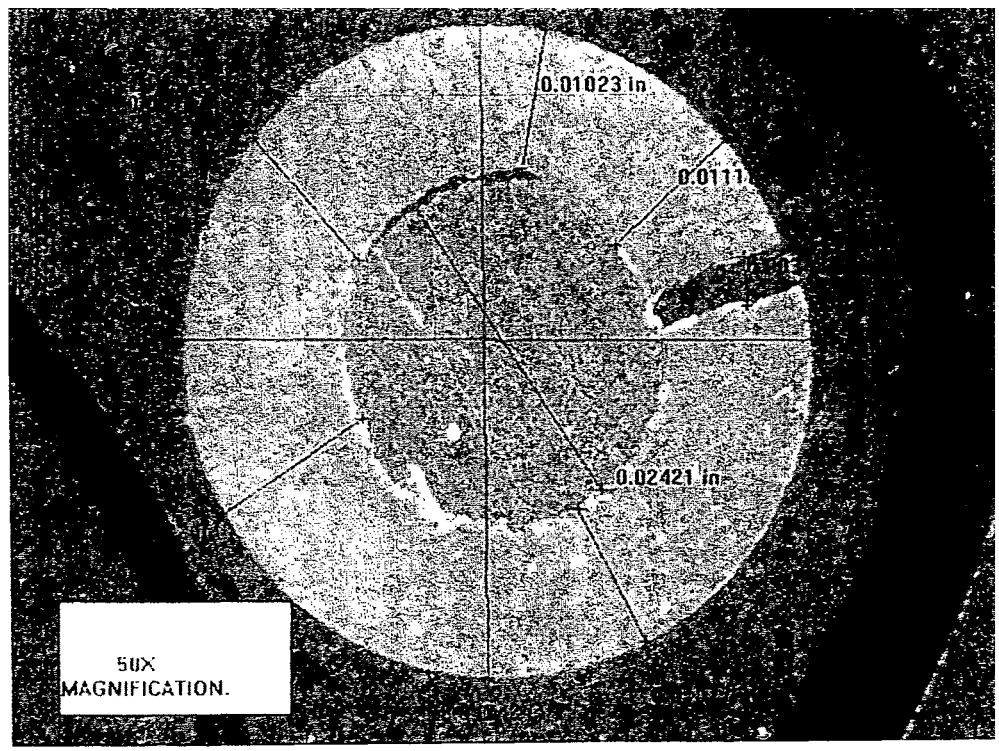
FIG. 5 is a magnified cross section of another coaxial weld wire.

FIG. 4 and FIG. 5 show the cross sections of the weld wires at the 50× magnification. FIG. 4 shows a cross section of the wire made of two strips bent in a lap formation. FIG. 5 shows a 50× magnification of a double strip coaxial wire.

To form a weld on a work piece using the welding apparatus with a novel consumable weld wire electrode of the present invention, a welding process uses a welding apparatus with means for feeding the wire electrode and means for supplying a shielding gas into the apparatus. The means for feeding the wire into the welding apparatus can comprise a wire drive and a wire reel, or any other suitable arrangement supplying the wire into the apparatus with the speed sufficient to replace the portion of the wire consumed during the welding process. It is contemplated that the means for feeding the wire into the welding apparatus can be internal or be located outside of the apparatus. The welding apparatus is coupled to a power supply and the arc is formed between the electrode and the work piece on which the weld is to be formed. Supplying the shielding gas into the welding process can be done from an external gas supply feeding the gas into a gas nozzle of the welding apparatus.

The process of manufacturing the wires contemplated by the present invention comprises the steps of forming and drawing, wherein the drawing step can be replaced by rolling if desired. During the forming step continuous steel strips pass through a series of forming rolls to be formed into a coaxial, or non-coaxial, or any other desired shape which is then forced through a series of dies to reach the desired diameter of the wire. Double coaxial or non-coaxial wires involve two strips formed and drawn at the same time with a coaxial or non-coaxial wire inside a barrel shaped wire.

Variations and modifications of the foregoing are within the scope of the present invention. It is understood that the invention disclosed and defined herein extends to all alternative combinations of two or more individual features mentioned or evident from the text and/or drawing. All of these different combinations constitute various alternative aspects of the present invention. The embodiments described herein explain the mode known for practicing the invention and will enable others skilled in the art to utilize the invention. The claims are to be construed to include alternative embodiments to the extent permitted by existing art.

Various features of the present invention are set forth in the appended claims:

What is claimed is:

1. A non-powdered weld wire electrode comprising a non-powdered solid metal core with a seam made of a non-powdered bent metal strip, and a non-powdered solid sheath wrapped around the solid core and comprised of a non-powdered metal strip bent to form the solid sheath with at least one seam, the non-powdered weld wire electrode achieving a deposition rate up to 10.3 lbs/hr at 250A, up to 15 lbs/hr at 300A, or up to 18.7 lbs/hr at 350 A in a gas-metal arc welding process.

2. A non-powdered weld wire electrode comprising a non-powdered metal strip bent to form a non-powdered solid core with at least one seam nested within a non-powdered solid sheath comprised of a non-powdered metal strip bent to form the solid sheath with at least one seam, the wire having interstices within the metal core and an interface between the core and the sheath, the wire achieving a deposition rate of 10.3 lbs/hr at 250 A in a gas metal arc welding process.

3. A non-powdered weld wire electrode comprising a non-powdered metal strip bent to form a non-powdered solid core with at least one seam nested within a non-powdered solid sheath comprised of a non-powdered metal strip bent to form the solid sheath with at least one seam, the wire having interstices within the metal core and an interface between the core and the sheath, the wire achieving a deposition rate of 15 lbs/hr at 300 A in a gas metal arc welding process.

4. A non-powdered weld wire electrode comprising a non-powdered metal strip bent to form a non-powdered solid core with at least one seam nested within a non-powdered solid sheath comprised of a non-powdered metal strip bent to form the solid sheath with at least one seam, the wire having interstices within the metal core and an interface between the core and the sheath, the wire achieving a deposition rate of 18.7 lbs/hr at 350 A in a gas metal arc welding process.

* * * * *